United States Patent [19]

Alaers et al.

[11] Patent Number: 5,149,559

[45] Date of Patent: Sep. 22, 1992

[54] PROCESS FOR THE PREPARATION OF A LOW CALORIE BUTTER SPREAD AND PRODUCTS OBTAINED BY SAID PROCESS

[75] Inventors: Belinda Alaers, Keerbergen, Belgium; Peter B. Ernsting, Delft, Netherlands; Pieter M. Holemans, Kapellen, Belgium; Cornelis Van Der Struis, Vlaardingen, Netherlands

[73] Assignee: Van den Bergh Foods Co., Division of Conopco, Inc., Lisle, Ill.

[21] Appl. No.: 713,633

[22] Filed: Jun. 10, 1991

Related U.S. Application Data

[63] Continuation of Ser. No. 485,415, Feb. 27, 1990, abandoned.

[30] Foreign Application Priority Data

Mar. 3, 1989 [GB] United Kingdom ............... 8904941
Nov. 13, 1989 [GB] United Kingdom ............... 8925623

[51] Int. Cl.$^5$ ............................................. A23D 7/00
[52] U.S. Cl. .................................. 426/602; 426/603; 426/586; 426/804
[58] Field of Search ............... 426/43, 602, 603, 586, 426/570, 804

[56] References Cited

U.S. PATENT DOCUMENTS

| | | | |
|---|---|---|---|
| 1,024,009 | 4/1912 | Kronenberger | 426/603 |
| 1,605,009 | 11/1926 | Spaeth | 426/43 |
| 3,772,447 | 11/1973 | Damerow | 426/342 |
| 4,307,125 | 12/1981 | Amer | 426/586 |
| 4,425,370 | 1/1984 | Graves | 426/603 |
| 4,447,463 | 5/1984 | Antenore et al. | 426/603 |
| 4,513,017 | 4/1985 | Moran et al. | 426/603 |
| 4,606,926 | 8/1986 | Wiles et al. | 426/603 |
| 4,769,255 | 9/1988 | Ahmed et al. | 426/603 |
| 4,849,243 | 7/1989 | Sreenivasan et al. | 426/602 |
| 4,917,915 | 4/1990 | Cain et al. | 426/804 |

FOREIGN PATENT DOCUMENTS

| Number | Date | Origin |
|---|---|---|
| 0139398 | 5/1985 | European Pat. Off. |
| 8300005 | 1/1983 | PCT Int'l Appl. |
| 833116 | 4/1960 | United Kingdom |
| 1046499 | 10/1966 | United Kingdom |
| 2081294 | 2/1982 | United Kingdom |

OTHER PUBLICATIONS

European Search Report and Annex.
Abstract of FR 2168283.

*Primary Examiner*—R. B. Penland
*Attorney, Agent, or Firm*—Rimma Mitelman

[57] ABSTRACT

The invention relates to a method of preparing a low-calorie butter-based spread, and to low calorie butter-based products obtainable by those methods and provides: a process for the preparation a low fat spread in which a lacteal fluid, preferably dairy cream, containing less than 45% wt. butterfat is:

a) enriched to 55%–75% wt. fat, b) diluted with an aqueous phase relatively free of lactose, and, c) cooled and worked whereby phase inversion occurs and a spread comprising 30–60% wt. of a fat results.

The use of non-dairy aqueous phase enables the copper and lactose content of the product to be controlled avoiding microbiological and organoleptic difficulties. The presence of other dairy substances in the water phase, such as caseinate and/or whey proteins, is optional. The term "lacteal fluid" as applied to the starting material is intended to include relatively low fat creams and milks as well as 40% fat creams.

9 Claims, 1 Drawing Sheet

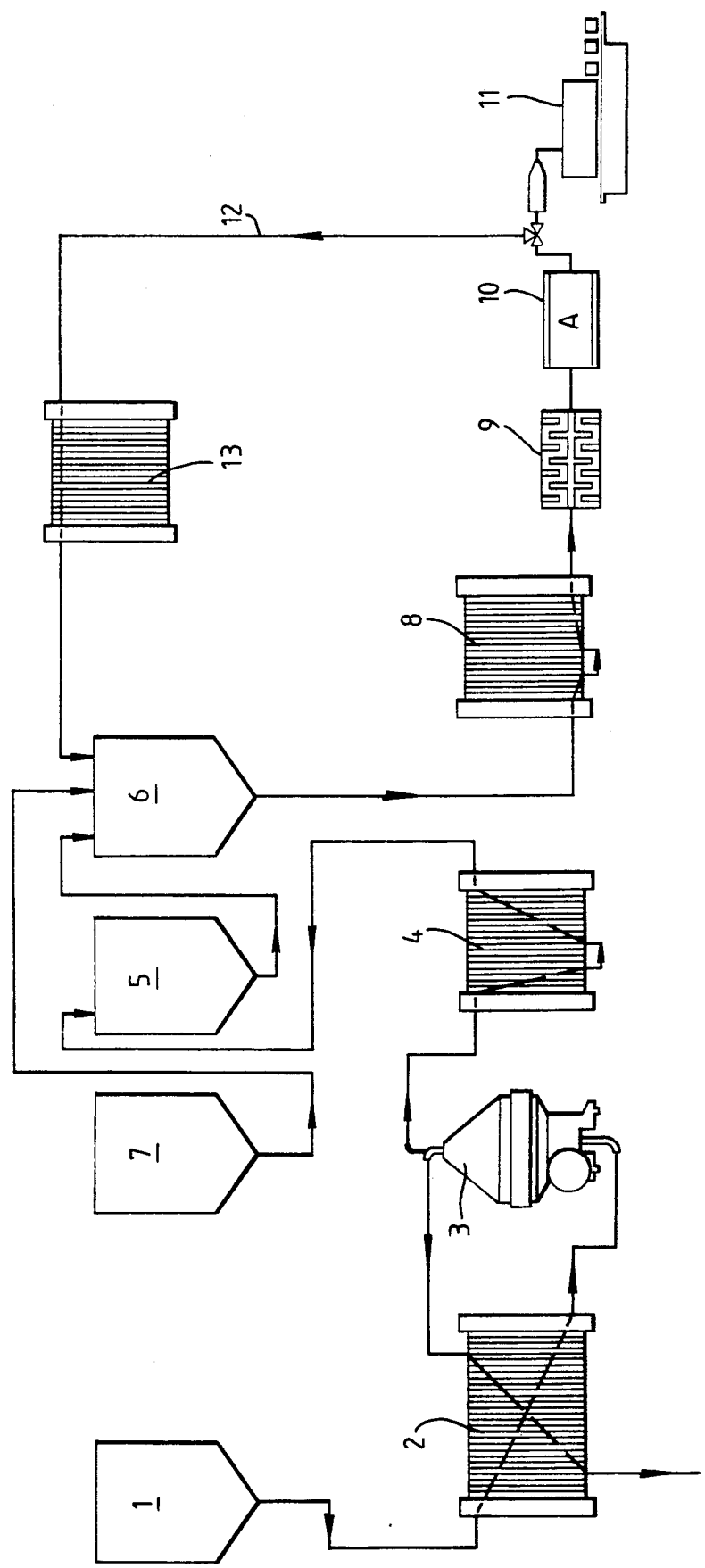

PROCESS FOR THE PREPARATION OF A LOW CALORIE BUTTER SPREAD AND PRODUCTS OBTAINED BY SAID PROCESS

This is a continuation application of Ser. No. 07/485,415, filed Feb. 27, 1990, now abandoned.

The present invention relates to a method of preparing a low-calorie butter-based spread, and to low calorie butter-based products obtainable by those methods.

Creams are emulsions of the oil-in-water type, and are well known both as starting materials and intermediates in methods for the production of spreads. In such methods the disperse fat phase of the cream is converted into a continuous, part-crystallised fat phase in which a dispersed aqueous phase is present. In conventional butter-making this is accomplished by churning whereby partial phase separation occurs with loss of much of the aqueous phase as buttermilk.

Churned butter has desirable mechanical properties as regards spreadability and elasticity over a relatively narrow range of temperatures, and much research has concerned how this range can be extended.

Butter contains a high (80–82%) level of fat which many consumers find unacceptable, and further research has concerned how a proportion of this fat may be replaced by vegetable fats, as vegetable fats are generally thought to be nutritionally more acceptable than animal fats, and give the additional benefit of softening the end product. Such a method is disclosed in GB 1217395.

An alternative to the replacement of fat for fat has been the incorporation of additional aqueous phase containing a suitable gelling or thickening agent, to form a so-called "low calorie butter".

A method of producing a low calorie butter (U.S. Pat. No. 4,307,125) involves prevention of the loss of buttermilk during churning. In this method a 40–60% cream is treated with an emulsifier and a hydrocolloid, homogenised and subsequently inverted, without loss of buttermilk, in a swept-surface heat-exchanger. A disadvantage of this method is that the product tends to be too sweet for the consumer, as the original cream contains a relatively high level of lactose.

Other methods of introducing the additional aqueous phase into butter have been suggested. For example, Kronenberger (U.S. Pat. No. 1,024,009) suggests that butter should be completely melted in a hot solution of gelatin in milk and the resulting mixture stirred and cooled to give a substantially solid emulsion.

In the process of Kronenberger and other low-shear mixing processes the valued structure and texture of butter is not found in the end-product which contains high levels of lactose. Worse still, the product may have microbiological weakness due to a water-continuous structure and would contain an appreciable portion of flocculated milk protein. Although an improved product can be made without detriment to the spreading properties by taking care that the butter does not melt prior to or during mixing, but merely softens (GB 2021140), this procedure is difficult to operate on an industrial scale, as local overheating of the butter can lead to a product with a "cooked" taste. A more important disadvantage of these processes is that one of the starting materials is butter. The production of this butter entails, as a by-product, the formation of a quantity of buttermilk for which comparatively few bulk uses are known.

Manufacturers of low calorie butters have encountered problems with taste in addition to that of lactose mentioned briefly above. One such problem is the presence of a bitter taste, the origin of which is not entirely clear but which is believed to be associated with certain milk-salts present in the original cream.

In the manufacture of dairy butter it is commonplace to ferment the cream. This has the effect of souring the cream due to the production of lactic acid. A butter made from soured cream is known to be less sweet, to have a richer aroma, and the butter yield in the churn is known to be higher. However, a disadvantage of soured cream is that if traces of copper or other heavy-metals is present the product is prone to rapid spoilage and a metallic taste.

A further disadvantage of current low calorie butters occurs when the cream is soured using chemical rather than biological methods, as the addition of lactic and/or citric acid to the product is found unacceptable by some consumers, as these products are prone to a sharp chemical taste rather than a natural butter taste.

Thus, while low-calorie butters have been the subject of considerable development, it has proved difficult to produce a product with both acceptable microbiological and organoleptic properties.

We have now identified a process for production of low calorie butters which overcomes the above-mentioned difficulties, and yields a microbiologically and organoleptically acceptable product with a reduced fat content.

In our process a lacteal fluid, preferably dairy cream with a fat content of around 45% wt. or less, is enriched to a fat content above 55% wt. and subsequently diluted with a non-dairy aqueous phase relatively free from components such as lactose, copper and salts: to effectively wash lactose out of the lacteal fluid. The concentrated/diluted cream is then inverted under conditions which preclude loss of buttermilk and give a low fat product.

It is believed that replacing the water phase without isolating the fat component of the cream, preserves the structure of the fat globules present in dairy cream and in particular the fat-droplet size distribution. It is further believed that the fat composition of dairy cream droplets varies with size and envisaged that whereas prior methods disturb this distribution the present method preserves a substantial portion of it.

Accordingly the present invention provides a process for the preparation a low fat spread in which a lacteal fluid, preferably dairy cream, containing less than 45% wt. butterfat and more than 45% of a first aqueous phase is:
a) enriched to 55%–75% wt. fat,
b) diluted with a second aqueous phase relatively free of lactose, and,
c) cooled and worked whereby phase inversion occurs and a spread comprising 30–60% wt. of a fat results.

The use of a second (non-dairy) aqueous phase enables the copper and lactose content of the product to be controlled avoiding microbiological and organoleptic difficulties. The presence of other dairy substances in the first or second aqueous phase, such as caseinate and/or whey proteins, is optional. The term "lacteal fluid" as applied to the starting material is intended to include relatively low fat creams and milks as well as 40% fat creams.

There are two ways of enriching the fat content of the lacteal fluid as required by step (a) above. The first method is to remove a proportion of the first aqueous phase from the fluid, thereby increasing the relative proportion of fat present. The second way is to add further fat to the fluid, also increasing the proportion of fat present.

Typically, the lacteal fluid is a dairy cream having a butterfat content of between 35 and 45%. Such a cream can be obtained by the separation of a lactose-rich aqueous fraction of the first aqueous phase from a low fat lacteal fluid such as milk, although removal of a larger aqueous fraction is then required.

Concentration of milk in a cream separator can be done by known methods. The by-product of this concentration is skim-milk which can be put to a variety of uses. If a cream with a butter-fat content of over 70% is used the high viscosity of such a cream makes it difficult to handle.

As an alternative it is possible to produce artificial concentrated cream by addition of butterfat to a low- or medium-fat lacteal fluid. While it is possible to add whole butterfat at this stage it is also possible to add butter fractions, particularly lower-melting butter fractions.

The possible addition of minor quantities of non-dairy fats or fat replacers at this stage is not excluded.

A gelling or thickening agent can be present in the concentrated lacteal fluid prior to phase inversion. Generally, the gelling or thickening agent will be a hydrocolloidal gelling or thickening agent, preferably gelatin or Danish Agar. A particular advantage of gelatin is that it can be undercooled without setting thereby permitting ease of working. If the gelatine solution is deeply cooled it is necessary to ensure that the solution is stirred in order to prevent setting.

In certain embodiments of the invention the lacteal fluid is soured, either before or after the concentration step. Where souring is performed by a biological rather than a chemical method a heat-treatment of the lacteal fluid can be employed to prevent further souring after a predetermined pH has been reached.

Preferably, this heat treatment comprises the step of heating the fluid to a temperature in excess of 50° C. One convenient way of accomplishing this heating is to mix the soured fluid with a hot second aqueous phase in a ratio such that the final temperature of the mixture exceeds 50° C. An alternative to this is to use a heat-exchanger or other heating means. Heat treatment is preferably carried out at a temperature of above 85° C.

It is noted that part of the above-mentioned process bears a similarity to the process disclosed in U.S. Pat. No. 1,605,009. In the prior process a sweet cream is ripened by means of a lactic culture before admixture with a solution of gelatin in milk. Although the purpose of the prior method is in part to prevent the progression of fermentation beyond a certain point, the prior method does not solve the organoleptic problems of low-calorie butter manufacture. Indeed, the prior process uses a dairy aqueous phase (milk) as the diluent for the soured cream and obtains a product which is markedly dissimilar to that obtained by the present process, especially in that the content of lactose and milk-salts in the final product will be quite high. For these reasons the process of U.S. Pat. No. 1,605,009 cannot be seen as an anticipation of the present method.

Before cooling and working, emulsifiers and flavours may be added to the fluid. It has been determined that these are optional as dairy cream contains sufficient natural emulsifiers and flavours to give a good product without the need for artificial additives. Cooling and working of the fluid to form a spread is preferably carried out in a blending apparatus of the type known generally as a "C-unit" and in a scraped-surface heat-exchanger of the type generally exemplified by that sold under the "Votator" registered trade mark, and known as a "Votator" or "A-unit".

In order that the invention may be further understood, the following, non-limiting, example is given by way of illustration of the process and the products obtained thereby. The example refers to the accompanying figure, which is a schematic representation of a process line by means of which the present invention may be applied.

In general the example relates to the preparation of a product using milk as the lacteal fluid starting material. However, the process is equally applicable to the preparation of a spread from cream in which instance the initial steps of the process may be omitted.

Turning to the figure, there is shown a milk storage tank (1) for the storage of milk at 5° C., supplying a conventional cream separator (3) via a plate heat exchanger (2). The service stream supply of the plate heat exchanger has been omitted for clarity, as has other auxiliary piping and pumps throughout the figure. The milk enters the process flow-space of the plate heat exchanger at the storage temperature of 5° C. and is heated to a temperature of 55° C. therein, at which temperature it emerges from the heat exchanger.

The heated milk is fed to the cream separator (3) where it is separated into a fat-rich cream stream and a skim-milk stream. Both streams are discharged from the separator at a temperature of around 55° C., and it is convenient for the hot skim-milk stream to be used to regeneratively heat the process stream in the heat-exchanger (2). The skim milk is cooled stored and may be put to a variety of uses.

The cream separator (3) shown in schematic form is a conventional centrifugal cream separator. As will be appreciated by the skilled man, this separator may be provided with means for cleaning-in-place, and/or means for regulating the fat content of the cream to the desired value of at least 50% fat. As has been noted above, fat contents of above 70% lead to some difficulties due to the increase of viscosity with increased fat content and the accompanying risk of blockage of the separator or other parts of the plant.

The above-mentioned steps may be partially avoided by the use of dairy cream as the starting material. However it is still necessary to remove a lactose rich aqueous fraction from the cream.

From the separator (3) the cream is fed to a Pasteurizer (4) which in the example is a plate heat-exchanger equipped for regenerative heating of the process stream to a temperature of 85° C. and cooling of the process stream after a brief holding period (15 seconds) to an outlet temperature of 25° C. As with the aforementioned heat-exchanger (2) the service streams and service supply have been omitted for clarity.

The Pasteurised cream emerges from the Pasteurizer at a temperature of 25° C. and is charged into a water-jacketed batch fermentation vessel (5) where the cream is maintained at a temperature of 25° C. The cream is inoculated with a suitable culture and allowed to ferment for 16–18 hours until a final pH of less than 4.6 is achieved. It was observed that the pH initially fell rather rapidly, but the rate of drop of the pH subsequently reduced to a level at which the minor variations in the fermentation time had little effect on the final pH. This stabilization of pH meant that the overall timing of the batch fermentation was not critical in the operation of the complete process.

The sour, fermented cream is fed from the fermentation vessel (5) to a water-jacketed, stirred premix tank (6) where it is mixed with the second non-dairy aqueous phase supplied from a further water-jacketed tank (7). The premix is maintained at a temperature of 55° C. at which temperature fermentation effectively ceases.

The second aqueous phase is constituted as follows, the percentages being with respect to total product;

| gelatin | | 2.5% wt |
|---|---|---|
| salt | | 0.4% wt |
| potassium sorbate | | 0.1% wt |
| Beta-carotene | | 0.3% wt |
| water | to | 33.3% wt on product |

This second aqueous phase is stored before use at a temperature of 95° C.

Blending of the above-mentioned quantities of the second aqueous phase at 95° C. with 66.7% wt. (on product) of the soured cream at the fermentation temperature of 25° C. produces a blend at a temperature of close to 55° C., and a pH of 5.1.

The remaining 0.1% wt. of the premix is the emulsifier "Hymono 8903", diluted in oil.

From the premix tank (6), the premix is pumped into a second Pasteurizer (8), where it is heated to the Pasteurization temperature of 85° C., held briefly (15 seconds) at this temperature and cooled to an outlet temperature of 13° C.

The premix emerging from the Pasteurizer is fed to a C-unit (9) with an outlet temperature of 21° C. and thereafter to an A-unit (10) with an outlet temperature of 14° C., at which temperature it is packed.

In order to accommodate break-downs in the packaging apparatus (11), a rework line (12) enabled selective recirculation of the inverted emulsion through a further heat-exchanger (13) to the premix tank (6).

Typical hardness values for the product were obtained according to the method of Haighton et al (J.A.O.C.S 36, 1959, p. 345) as C-values at the indicated temperatures;

| 5 Celsius | 2200-2350 |
|---|---|
| 10 Celsius | 1650-1850 |
| 15 Celsius | 980-1180 |
| 20 Celsius | 335-290 |
| 25 Celsius | 0 |

A 100% salt-release was observed at a temperature at 34 Celsius. The spread exhibited a consistent colour, translucency and gloss at 15° C.

What is claimed is:

1. A process for the preparation of a low fat, water-in-oil emulsion spread containing 30–60% wt. of a continuous fat phase and a dispersed aqueous phase, the process comprising the steps of:
    (a) enriching the fat content of a fat-containing lacteal fluid containing less than 45% wt. butterfat and more than 45% of a first, lactose-containing aqueous phase, to obtain an enriched lacteal fluid having 55–75% wt. fat;
    (b) diluting said enriched lacteal fluid with a second aqueous phase having a lower lactose content than said first aqueous phase, to obtain a mixture having 30–60% wt. fat; and
    (c) cooling and working said mixture, whereby phase inversion occurs and said low fat spread is obtained.

2. A process according to claim 1 wherein the lacteal fluid is dairy cream and (b) step comprises separation of a lactose containing aqueous fraction of the first aqueous phase.

3. A process according to claim 2 wherein lacteal fluid is soured either prior to or following dilution with the second aqueous phase.

4. A process according to claim 3 wherein a heat treatment to prevent further souring is applied following a fall in the pH of the lacteal fluid.

5. A process according to claim 2 wherein the enrichment step is performed in a cream separator.

6. A process according to claim 1 wherein (b) step is performed in a cream separator.

7. A process according to claim 1 wherein (b) step is accomplished by addition of butterfat to a low- or medium-fat lacteal fluid.

8. A process according to claim 1 wherein cooling and working are performed in a pin-stirrer and/or a scraped-surface heat-exchanger.

9. A process according to claim 1 which further comprises the step of combining the lacteal fluid with a vegetable fat.

* * * * *